US005819534A

United States Patent [19]
Fischer et al.

[11] Patent Number: 5,819,534
[45] Date of Patent: Oct. 13, 1998

[54] ARTICULATED AERIAL DEVICE WITH HYDRAULIC UPPER BOOM COMPENSATION

[75] Inventors: Gregory L. Fischer, Watertown; Joseph R. Beving, Clark; Charles A. Schulte, Watertown, all of S. Dak.

[73] Assignee: Simon-Telelect, Inc., Watertown, S. Dak.

[21] Appl. No.: 718,926

[22] Filed: Sep. 25, 1996

[51] Int. Cl.$^{6}$ ..................................................... F16D 31/02

[52] U.S. Cl. ................................ 60/424; 60/426; 91/517; 91/520; 180/2.9

[58] Field of Search ............................ 60/420, 424, 426; 91/511, 512, 517, 520; 182/2.1, 2.9

[56] References Cited

U.S. PATENT DOCUMENTS

| | | | |
|---|---|---|---|
| 2,815,250 | 12/1957 | Thornton-Trump | 304/29 |
| 3,741,337 | 6/1973 | Visinsky | 182/148 |
| 4,113,054 | 9/1978 | Myers | 60/421 X |
| 4,188,757 | 2/1980 | Smith, Jr. | 52/111 |
| 4,222,457 | 9/1980 | Ashworth | 182/2 |
| 4,403,474 | 9/1983 | Ruthven | 60/419 X |
| 4,408,518 | 10/1983 | Diel et al. | 91/520 X |
| 4,514,796 | 4/1985 | Saulters et al. | 182/2.9 X |
| 4,602,462 | 7/1986 | Anderson | 52/119 |
| 4,643,273 | 2/1987 | Stokoe | 182/2 |
| 4,775,029 | 10/1988 | MacDonald et al. | 182/2 |
| 5,016,767 | 5/1991 | Thibault | 212/188 |
| 5,107,955 | 4/1992 | Kishi | 182/2.1 |
| 5,110,251 | 5/1992 | Gray | 91/520 X |
| 5,249,643 | 10/1993 | Backer et al. | 182/2 |
| 5,388,662 | 2/1995 | Tranchero | 182/63 |
| 5,447,094 | 9/1995 | Geyler, Jr. | 91/520 |
| 5,669,282 | 9/1997 | Tanino et al. | 91/520 |

*Primary Examiner*—Hoang Nguyen
*Attorney, Agent, or Firm*—Andrus, Sceales, Starke & Sawall

[57] ABSTRACT

An aerial lift unit is truck mounted. The lift includes a lower boom pivoted to the truck and an upper boom pivotally connected to the outer end of the first boom. A lower boom cylinder unit is connected to pivot and thereby raise and lower the lower boom. A second tandem cylinder unit consists of first and second cylinders with the head end interconnected and having cylinder rods extending coaxially outwardly from the opposite rod ends. The one cylinder rod is connected to the lower boom and the second piston rod is connected to the base of a V-shaped coupling member having one arm pivotally connected to the lower boom and a second arm is pivotally connected to the upper boom. The second cylinder positions the upper boom in a preset orientation with respect to the lower boom. The first cylinder is connected in a hydraulic supply circuit with the lower boom cylinder and with the hydraulic fluid flow serially through the lift cylinder and second cylinder. The hydraulic fluid flow in one direction raises the lift unit and in the opposite direction lowers the lift unit, with automatic compensation of the upper boom position relative to the lower boom in all positions of the latter.

27 Claims, 7 Drawing Sheets

ARTICULATED AERIAL DEVICE WITH HYDRAULIC UPPER BOOM COMPENSATION

BACKGROUND OF THE INVENTION

This invention relates to an articulated aerial device with a plurality of interconnected booms and having hydraulic upper boom compensation apparatus, and particularly a hydraulic actuated upper boom angle control for maintaining the upper boom at a selected angle relative to the support during the raising and lowering of the lower boom assembly.

As a result of the compensation, the end support at the upper boom, such as the supporting basket or the like, is proportional to the lower boom movement.

Articulated aerial devices are widely used for locating operating personnel at elevated levels, as well as uses requiring rapid elevated positioning. Articulated aerial devices for locating of working personnel and operators at elevated positions should provide for prompt movement to the working position and in a most direct path. To provide for relatively high locations, articulated dual boom apparatus is used including a lower boom which is pivotally mounted to a support structure and an upper boom which is pivotally interconnected to the outer end of the lower boom.

Hydraulic lifting devices are often provided with mechanical mechanisms interconnecting the upper boom to a lower boom for the simultaneous raising of the lower boom while maintaining a controlled positioning of the upper boom. Without a compensating mechanism, the elevation of the lower boom reduces the elevation of the upper boom angle proportionally, thereby lowering the basket; requiring further readjustment of the upper boom position relative to the raised lower boom. Mechanical compensating systems had been incorporated into prior art lift train systems. Generally such devices consist of a roller chain and wire ropes, and insulating rods in combination with appropriate hydraulic cylinders to provide upper boom compensation. The roller chain is anchored to the fixed base support structure and the wire rope is anchored to the upper boom structure. The interconnection therebetween provides for the lifting of the upper boom as the lower boom is elevated.

Although such mechanical systems have been employed and provide improved orientation of the upper boom with respect to the lower boom, the costs with mechanical systems is quite high, including maintenance and replacement schedules.

SUMMARY OF THE PRESENT INVENTION

The present invention is directed to a hydraulic system including a hydraulic motor assembly interconnecting the upper and lower booms and a lifting hydraulic apparatus for pivoting the lower boom, in combination with a hydraulic circuit between the lower boom lifting apparatus and the motor assembly to maintain a desired raising orientation of the upper boom relative to the lower boom during lifting of the latter. Generally, in accordance with a preferred construction of the present invention, the system includes a lower boom cylinder unit that is interconnected hydraulically to an upper boom compensating cylinder unit, with hydraulic fluid flow to and from the lower boom cylinder passing through at least one compensation cylinder unit to maintain a precise preset raising orientation of the upper boom with respect to the lower boom during the raising of the lower boom. The hydraulic system also provides for individual orientation of the upper boom relative to the lower boom. Thus, generally in accordance with the present invention, the lower boom hydraulic supply is connected through a control unit to supply hydraulic fluid to the lower boom cylinder, and simultaneously to an upper boom/compensating cylinder unit to provide the coordinated position control. A manifold unit is interconnected in the hydraulic circuit to allow the lower boom cylinder and the compensating cylinder unit to reset to proper reference positions in the event of lack of proper timing of the cylinder units.

In a particular construction, the upper boom/compensating cylinder unit is designed with a compensating side and an upper boom positioning side. The positioning side functions as a conventional positioning device to move the upper boom relative to the lower boom, with the lower boom held fixed. This establishes a predetermined angular orientation from which the upper boom continues to raise as the lower boom rises, and maintains a similar orientation on lowering the lower boom. Thereafter, the compensating cylinder side is controlled by the lowering and raising of the lower boom with automatic compensation being provided by redirecting of the pressurized hydraulic fluid through the compensating manifold and in predetermined sequence through the lower boom cylinder and the compensating side of the upper boom/compensating cylinder unit.

In a particularly preferred system, the upper boom/compensating cylinder unit includes first and second cylinder units connected to each other in a tandem and axial in-line orientation. The first cylinder rod is connected to the lower boom and the second cylinder rod is connected to the upper boom. One cylinder unit is a positioning cylinder unit which controls the relative and preset positioning of the upper boom relative to the lower boom. The other cylinder unit is a compensating cylinder unit connected in a hydraulic circuit with the lower boom cylinder unit through a hydraulic compensating manifold. The compensating cylinder unit automatically changes the upper boom relative to the support to maintain the angular preset orientation during pivotal movement of the lower boom.

In the preferred circuit, the compensating manifold was provided which interconnected the pressure side and the return or tank side of the lower boom control valve to produce first and second paths through the lower boom cylinder and the compensating cylinder. To raise the lower boom, pressurized fluid was directed to the base end of the lower boom cylinder. The output of the lower boom cylinder was not returned directly to the supply or tank, but rather was directed to flow to the compensating cylinder to position the upper boom, with the hydraulic fluid from the opposite or exhaust side thereof being returned directly to the supply or tank through the compensating manifold. The preferred system has serial hydraulic fluid flow between the cylinders to and from the lower boom control valve. In lowering of the lower boom, a reverse flow and function has the supply hydraulic fluid connected to the compensating cylinder, and with the hydraulic fluid therefrom passing through the lower boom cylinder back to the supply.

The compensating manifold includes connecting lines and control valves that can be actuated during certain positions of the lower boom and upper boom. The control valves establishes controlled flow paths to insure that the lower boom cylinder unit and the compensating cylinder unit can retime, and thereby assure the proper movement of each.

In summary, the position compensation of the upper boom relative to the lower boom in the preferred construction is accomplished hydraulically through a lower boom cylinder and a hydraulic upper boom/compensating cylinder assembly, which physically connects the lower and upper booms and which are hydraulically connected in the circuit for simultaneously moving the upper and lower booms, with optimal positioning of the upper boom relative to ground support.

The present invention thus provides a highly effective, hydraulic compensation system and produces a relatively low cost system including cost effective maintenance and replacement schedules and cost, compared with the conventional mechanical systems.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment. In the drawings.

DESCRIPTION OF THE ILLUSTRATED EMBODIMENTS

Figure 1:
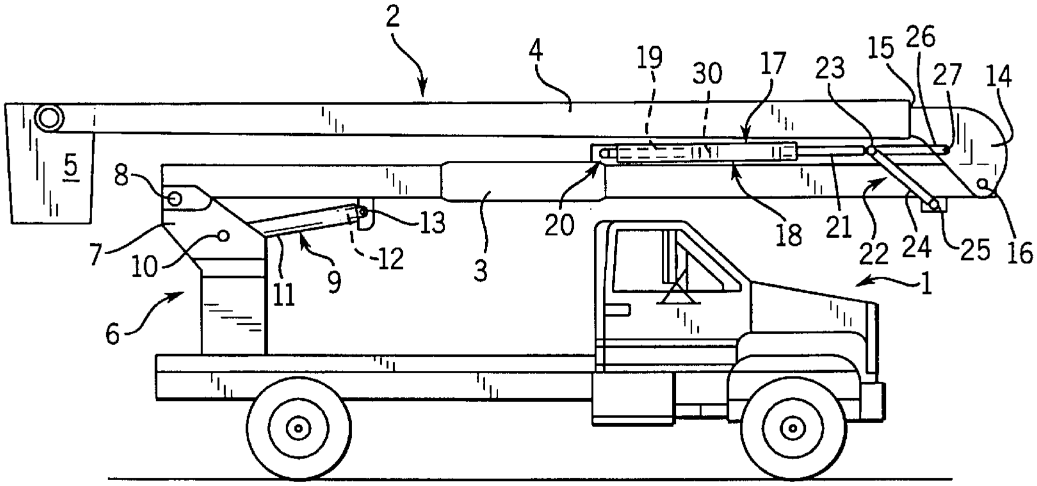
FIG. 1 is a simplified illustration of a truck mounted aerial lift assembly for locating an operator in various raised orientations.

Referring to the drawings, and particularly to FIG. 1, mobile aerial lift unit is illustrated in simplified presentation for clarity of illustration. The mobile aerial lift apparatus includes a truck 1 with an aerial lift unit 2 mounted to the bed thereof. The aerial lift unit 2 includes a lower boom 3 and an upper boom 4 pivotally interconnected to each other and to the truck bed through support 6 and rotatable support bracket 7. A basket 5 is shown secured to the outer end of the upper boom 4 within which the operating personnel are located during the lifting to and locating within a selected work area in accordance with known practice. Basket 5 is typically pivotally attached to the out end of the boom 4 to maintain a horizontal (level) orientation at all times. The aerial lift unit is mounted to the truck bed through support 6. A rotatable support bracket 7 is secured to the support 6 and projects upwardly. The lower boom 3 is pivotally connected as at pivot 8, to the rotatable support bracket 7. A lifting lower boom cylinder unit 9 is interconnected between bracket 7 and the lower boom 3. In the illustrated embodiment, a pivot connection 10 connects the lower boom cylinder 11 of unit 9 to the bracket 7. A cylinder rod 12 extends from the cylinder 11 and is pivotally connected to the boom 3 through a pivot 13. Lower boom cylinder unit 9 is connected to a hydraulic supply of a suitable hydraulic fluid, as more fully developed hereinafter.

The outer end of the lower boom 3 is interconnected to the lower and pivot end of the upper boom 4. A pivot 16 interconnects the outer end of the lower boom 3 to the pivot end of upper boom. An upper boom/compensating cylinder unit or assembly 17 is connected between the lower boom 3 and the upper boom for pivoting the upper boom about pivot 16 for positioning of the upper boom relative to the lower boom. The upper boom/compensating cylinder unit or assembly 17 is constructed to permit independent movement of the upper boom 4 relative to boom 3 and to provide a compensating motion between the booms to maintain the upper boom raising with the lower boom.

Figure 2:
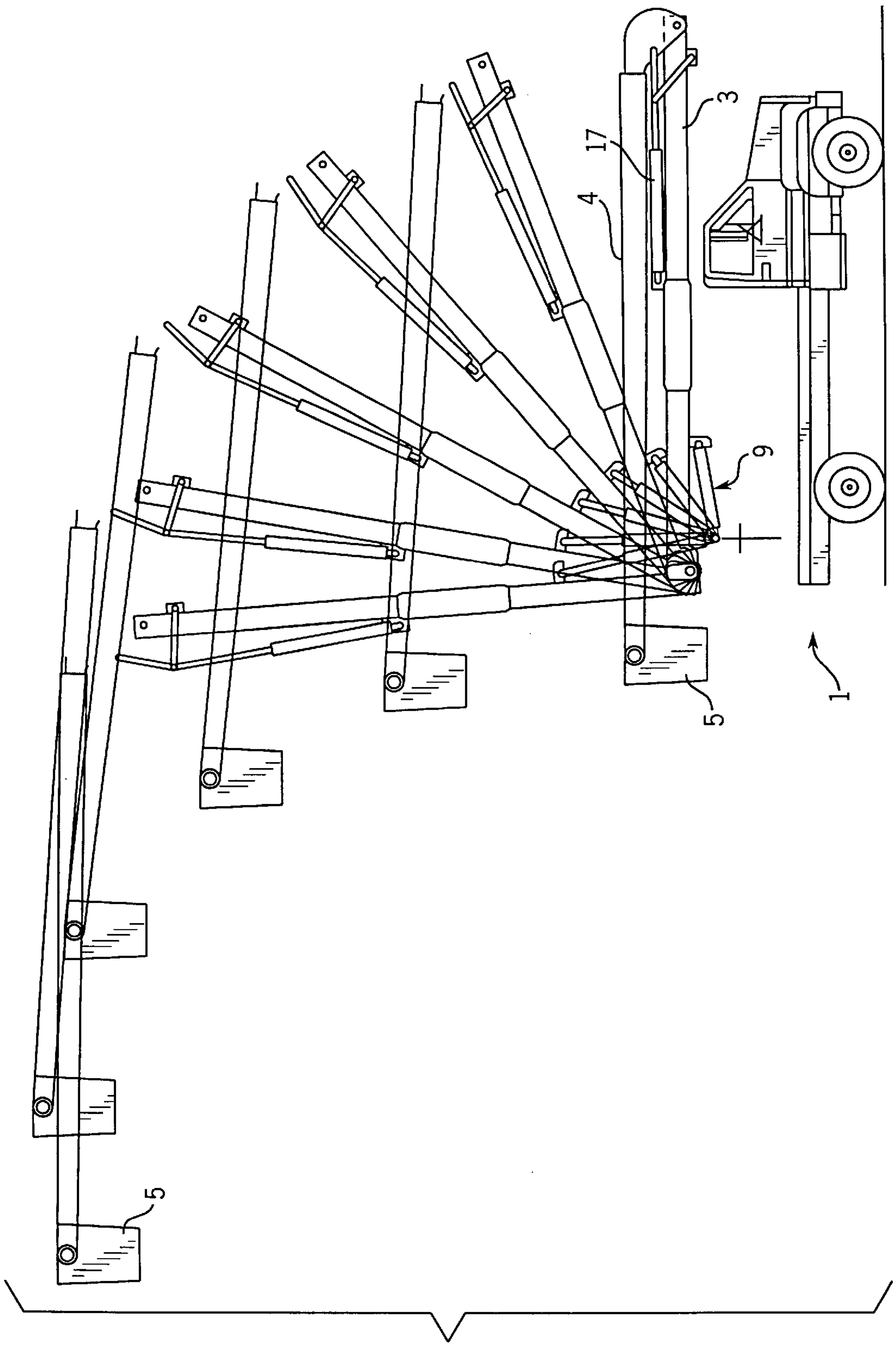
FIGS. 2 and 3 are a diagrammatic illustration of the apparatus of FIG. 1, illustrating a raised aerial lift device, with a somewhat different orientation of the upper boom and basket during the raising and lowering of the lower boom.
Figure 3:
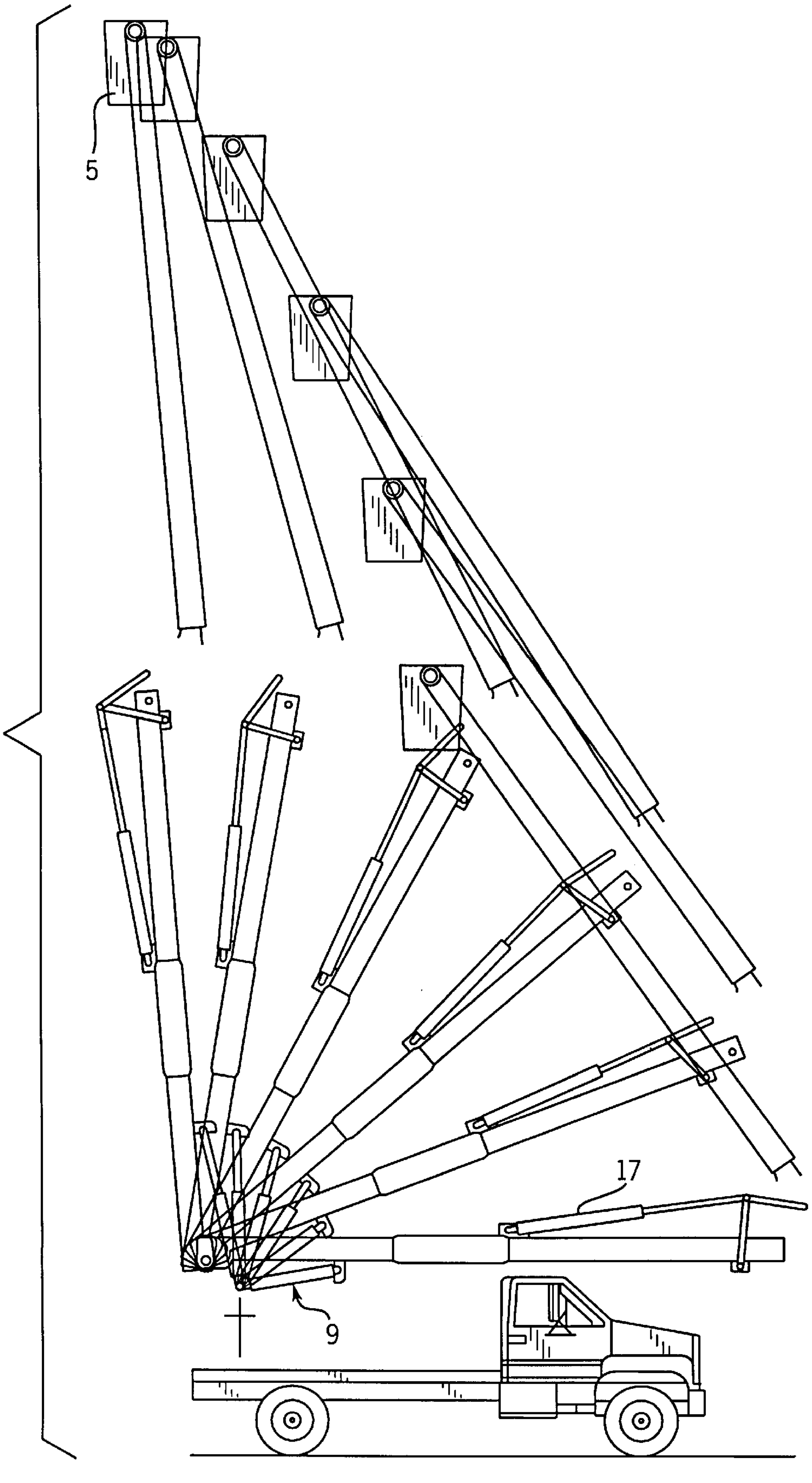

The upper boom/compensating cylinder unit 17 thus provides a hydraulic interconnection and compensation for boom 4 in a preset orientation of the upper boom relative to the support and ground, as more fully described hereinafter. The result of this action is depicted in the diagrammatic illustration of FIGS. 2 and 3. In FIG. 2, the upper boom 4 is preset to locate the boom and basket 5 in a substantially constant level parallel to the ground and with the upper boom and the basket rising with the raising of the lower boom. In FIG. 3, the boom 4 is preset to raise the basket to relative higher level with the boom maintaining a substantially increasing level of the upper boom end and basket 5 relative to the ground and support.

Figure 4:
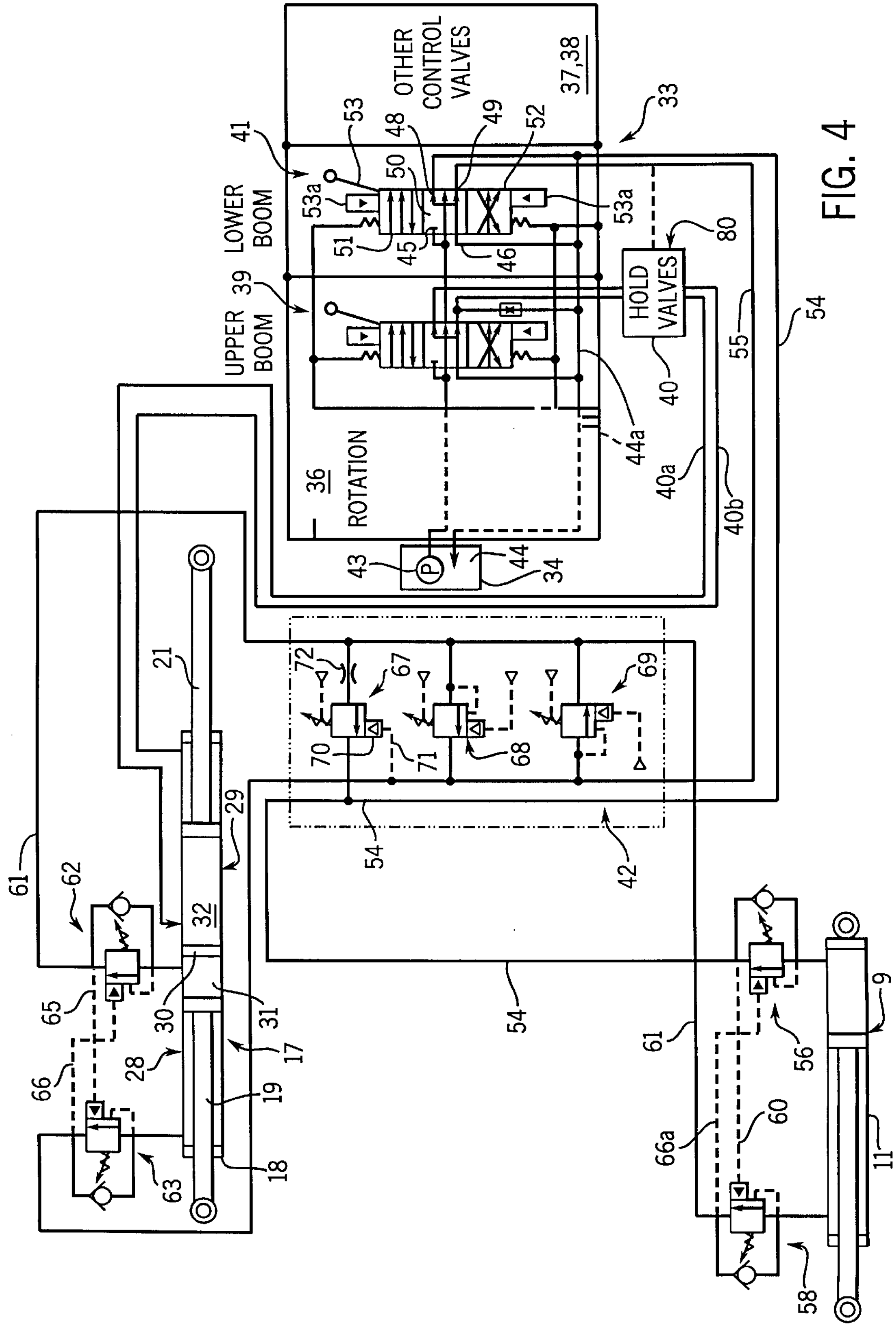
FIG. 4 is a schematic illustration of a hydraulic control including a hydraulic compensation circuit, in accordance with the teaching of the present invention.

Referring particularly to FIGS. 1 and 4, the upper boom/compensating cylinder assembly or unit 17 is a tandem cylinder unit. One end of the cylinder unit includes a cylinder rod 19 extended therefrom and connected to a generally central portion of the lower boom 3 by a pivot unit 20. A cylinder rod 21 also extends from the opposite end of the tandem cylinder unit 17 and is interconnected through a generally V-shaped coupling unit 22 to the connecting bracket member 14 on the end of the upper boom 4 and to the outer end of the lower boom 3. The V-shaped coupling unit 22 thus includes a common base connection 23 pivotally connected to the outer end of the cylinder rod 21 for pivotally supporting the coupling unit 22 thereto. The coupling unit 22 further includes a first arm 24 which extends outwardly beneath the lower boom 3 in the collapsed position of FIG. 1, and is pivotally connected to the lower boom 3 by a pivot 25. The second arm 26 of the coupling unit 22 extends generally in line with the cylinder rod 21, and parallel to the boom 3 in the collapsed position of FIG. 1, with the outer end pivoted to the connecting bracket member 14 of the upper boom by pivot unit 27.

Referring particularly to FIG. 4, the tandem cylinder unit 17 includes an elongated outer cylinder case which is separated thereof by a common headwall 30, defining a compensating cylinder section 28 including a cylinder 31 and an upper boom positioning section 29 including a cylinder 32.

The cylinder rod 21 and the associated piston provided is assembled in cylinder 32 for extending and retracting positioning of the upper boom 4 relative to the lower boom 3.

The cylinder rod 19 and its associated piston is assembled within the cylinder 31. Thus, the extending and retracting of the cylinder compensating section 28 of the cylinder unit 17 provides for the selective optimal positioning of the upper boom 4 relative to the lower boom 3 and the ground support.

The upper boom positioning section 29 thus operates directly to reposition the upper boom relative to the lower boom. The compensating section 28 operates in conjunction with the lower boom cylinder 11 to maintain a desired relationship and setting of the upper boom 4 relative to the lower boom 3 through a hydraulic interconnection between the section 28 and the upper boom cylinder unit 9.

A preferred hydraulic compensating hydraulic circuit is schematically shown in FIG. 4, with the interconnection between the cylinder unit 9 and compensating section 28 for providing the automatic hydraulic compensation of the position of the boom 4 during both the raising and lowering of the lower boom 3. The illustrated hydraulic circuit includes a manually operated control valve assembly 33 selectively circulating pressurized hydraulic fluid, which is generally a suitable hydraulic oil, from a supply unit 34 to the respective cylinders and other operating components of the aerial lift device. The control for other components is shown in block diaphragm as the controls are not related to the new system disclosed. A typical control valve 33 includes a boom rotating control valve 36, an upper boom control valve 39 and a lower boom control valve 41 for positioning of the aerial lift unit on support 6.

An upper boom position control valve 39 connects the supply unit 34 through a holding valve assembly 40 to the upper boom positioning section 29 of the upper boom/compensating cylinder unit 18. The actuation of the upper boom control valve 39 and holding valve assembly 40 results in selected well-known application of high pressure hydraulic fluid to one side of cylinder 32 and return hydraulic fluid from the opposite side relative to supply 34. This permits raising and lowering of boom 4 relative to boom 3.

In addition, the control valve 33 includes a lower boom control valve 41 connected in circuit between the supply 34 and the lower boom cylinder unit 11 and the upper boom compensating cylinder unit 18 and particularly the compensating section 28 thereof through a compensating manifold unit 42. The supply 34 has the conventional pressure source 43 and a hydraulic fluid supply tank 44. The pressure line is connected to the lever control valves to continuously supply hydraulic fluid to which even boom functions is selected.

Similarly, the hydraulic fluid supply tank 44 is connected via a return port 44*a* to return the exhaust hydraulic fluid from the circuit to the tank.

Referring particularly to the lower boom control valve 41, a supply pressure port 45 connected to the pressure source 43 and a return port 46 is connected to line 44*a*. The control valve similarly includes output ports 48 and port 49 for connection to internal ports 45 and 46 for respectively supplying of hydraulic fluid to the circuit for raising and lowering of the lower boom 3 and establishing compensating positioning of the upper boom 4. Thus, the control function of valve 41 is shown diagrammatically which includes a neutral position section 50, a lift or raising positioning section 51 for raising the lower boom 3, and a lower position section 52 for lowering of the lower boom 3. A manual positioning lever 53, as well as remote control inputs 53*a*, permits the selective movement of the valve from the neutral position to the raising or lowering positions.

Figure 5:
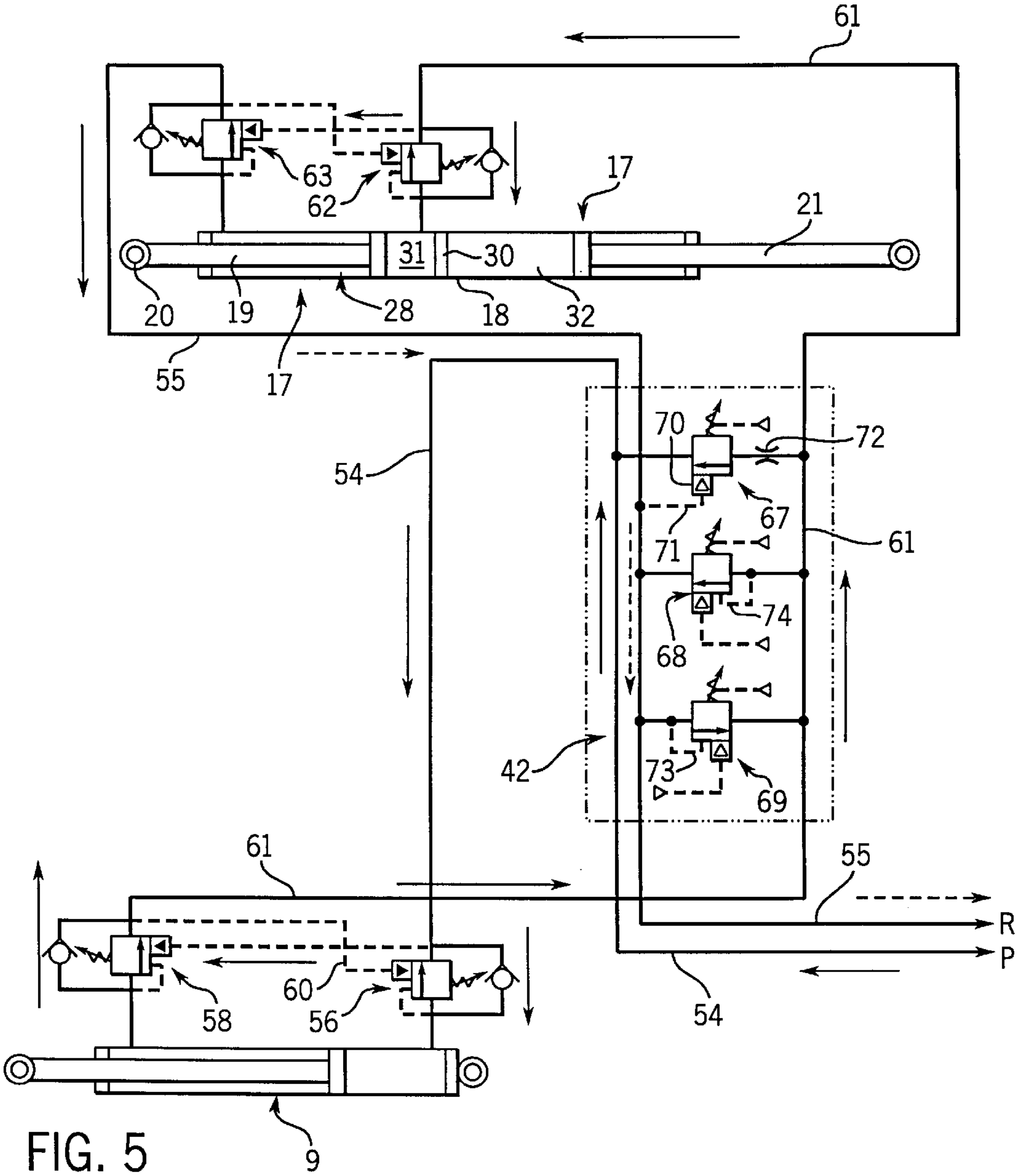
FIG. 5 is a partial view similar of FIG. 4 illustrating the hydraulic fluid flow for raising of the lower boom with automatic compensation of the upper boom.
Figure 6:
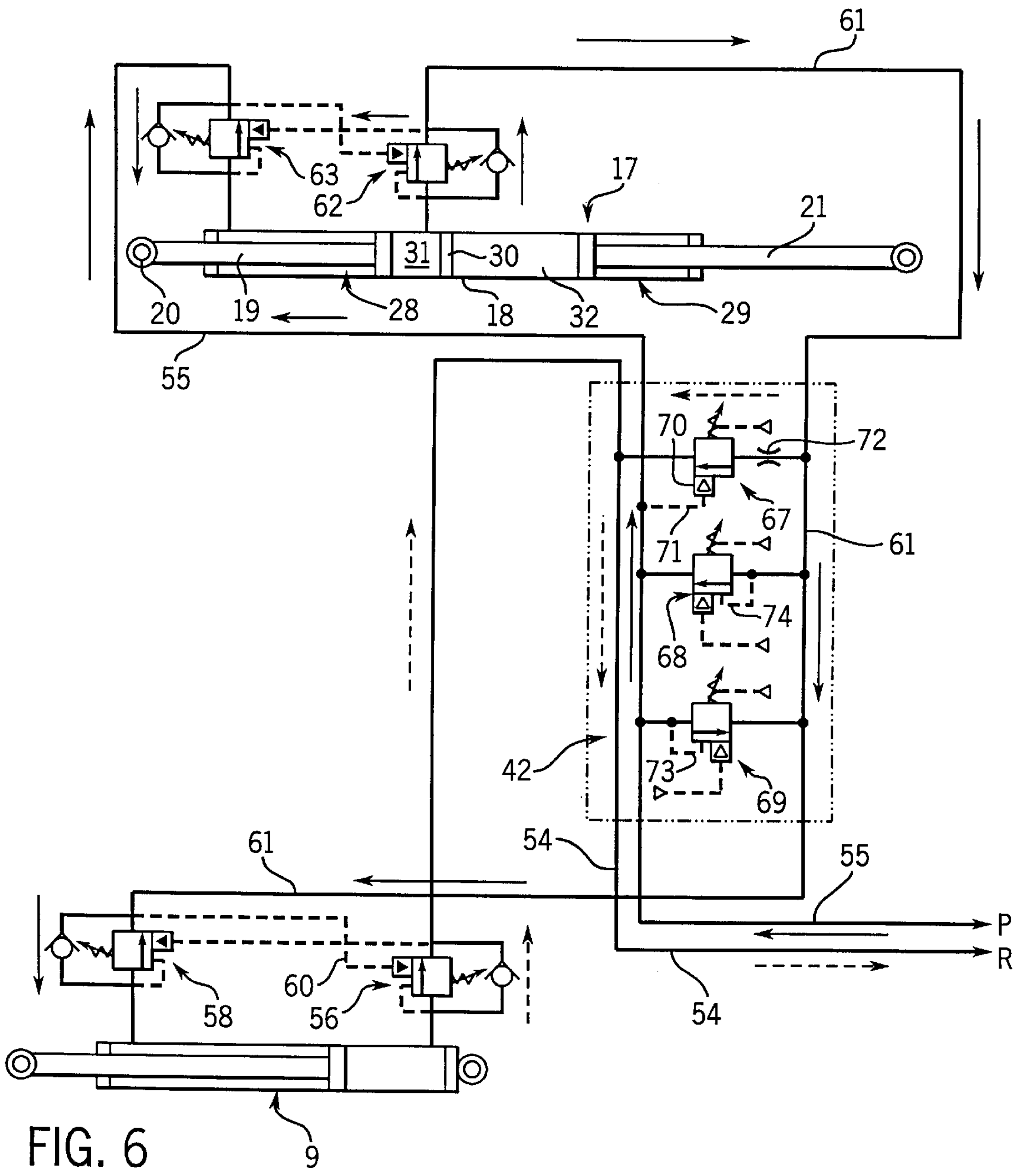
FIG. 6 is a partial view of FIG. 4 with the hydraulic fluid flow illustrated for lowering of the lower boom with automatic compensation of the upper boom.

Referring to FIGS. 5 and 6, the circuit is shown and described for raising and lowering of lower boom 3, with compensating positioning of the upper boom In FIG. 5, as well as FIG. 6, the pressure connected side and flow is shown by solid arrows and the return side and flow by broken arrows.

The hydraulic circuits as illustrated in FIG. 4 includes output port 48 and 49 connected to lines 54 and 55 which are connected through manifold unit 42 to the cylinder units 9 and 17.

As more fully developed hereinafter, the manifold unit 42, which interconnects the hydraulic lines 54, 55 and 61 to the compensating cylinder unit 28 and to the lift cylinder unit 9, includes a plurality of separate interconnecting control valve units for retiming to the lift cylinder unit 9 and the compensating cylinder unit 28.

Line 54 is attached directly to compensating manifold 42 for connection to the base end of the lift cylinder 11 of the lower boom cylinder unit 9. A holding valve 56 connects the line 54 to the cylinder 11. The holding valve 56 allows the hydraulic fluid to flow directly into the base end of the cylinder 9. The result is the extension of the cylinder rod for raising the lower boom 3. In the illustrated position of FIGS. 4 and 5, such movement is prevented as a result of holding valve 58. The holding valve 58, however, has a pilot input connected via a line 60 to the now pressurized line 54, to which a hydraulic signal opens the holding valve 58 to allow the flow of hydraulic fluid from the rod end of the lower boom cylinder 11. A compensating coupling line 61 passes directly from holding valve 58 to the compensating manifold 42 and terminates at holding valve 62 at compensating section 28 of the cylinder unit 17 which allows the flow of the hydraulic fluid into the base end of compensating cylinder 31 of compensating section 28.

The hydraulic fluid thus simultaneously extends the compensating section 28, with the hydraulic fluid to exhaust or exit from the rod end thereof. A holding valve 63 prevents the exhaust from the rod end. However, the holding valve 63 has its pilot input connected via a line 65 to line 61. As the hydraulic pressure increases in line 61, the holding valve 63 opens and allows the exit of hydraulic fluid from the rod end of the compensating section 28.

The hydraulic fluid thus exits through the valve 63 to the line 55 which is connected to the port 19 which is connected to the return port 44*a* by the lift section 51 of control valve 41 to complete the hydraulic circuit and permit the circulation of hydraulic fluid until such time as the control valve is returned to a neutral position, in which state the hydraulic circuit holds the aerial lift device in place. In this position, the compensating section 28 has maintained the optimal positioning of the upper boom 4 and the interconnected basket 5 relative to boom 3.

Thus, during the raising of the lower boom 3, the compensating cylinder section 28 simultaneously raises the upper boom 4. This establishes a true compensation with the upper boom continuously moving up with the lower boom and in essentially optimal orientation, as shown in FIGS. 2 and 3.

Referring to FIGS. 4 and 6, the circuit is illustrated for lowering of a raised lower boom 3 and upper boom 4. In this state, the position of the lower boom control valve 41 is reversed, with the internal ports of the lowering section 52 connecting the pressure side of the supply 43 to the line 55 and the return side or tank port 44*a* of the supply 34 to the line 54. In this position, the pressure is applied via line 55 through the manifold 42 to the holding valve 63 which allows the pressurized hydraulic fluid to flow to the rod end of the compensating section 28, particularly to the rod end of cylinder 31. This requires that the base end hydraulic fluid must exit to permit the movement of the compensating cylinder. The pressure applied via line 55 is transmitted as a pilot signal via a pilot signal line 66 to the pilot input of the holding valve 62. This opens holding valve 62 and allows the exit of hydraulic fluid from the cylinder base end of the cylinder 31 of compensating section 28.

This hydraulic fluid is transmitted via the line 61 to holding valve 58 at the rod end of the lower boom cylinder 11 of the lower boom cylinder unit 9. This allows the flow directly into rod end of the cylinder 11. A pilot signal via a line 66*a* is sent to the pilot input of the holding valve 56 at the base end of lower boom cylinder 11. This opens holding valve 56 to allow output flow of the hydraulic fluid from the base end of the cylinder 11 to allow the retracting of the lower boom cylinder 11 for lowering of the boom.

As previously noted, when the lower boom cylinder unit 9 is fully extended or retracted, the compensating cylinder unit 28 should also be fully extended or retracted with respect to the lower boom cylinder unit 9. If at such limit positions of either cylinder unit, the opposite cylinder unit is not in a related position, the cylinders are out of proper time relationship. The system should retime the cylinder unit which is out of the desired time and position relationship. The valving system of manifold unit 42 includes a plurality of control valve units 67, 68 and 69. The function of the compensation manifold is two fold. First, it provides a relief for any intensification that may occur between lower boom cylinder rod end and upper boom cylinder base end (compensation cylinder). The second function is to retime the compensation cylinder with the lower boom cylinder if they would become slightly out of time with each other. Some possible situations are described which requires functioning of valves 67, 68 and 69.

In the lowering of the booms to a retracted position, the position of the cylinder units may be out of time; resulting in the inability to properly store either booms. For example, with the lower boom cylinder unit 9 completely retracted and the compensating cylinder unit 28 not completely retracted, the cylinder units 9 and 28 are out of time position.

To retime the cylinders for this application, the following sequence takes place.

By activating the lower boom down control, hydraulic pressure begins to build in line 55 due to the complete retraction of the lower boom cylinder 11. When the pressure in line 55 meets or exceeds the pilot pressure setting of valve 67, a restricted amount of hydraulic fluid is allowed through valve 67 to line 54. Subsequently, a pilot line 80 which is connected to line 55 also allows the holding valve 40 on the rod end of the upper boom positioning cylinder to open. This allows the complete shift of the cylinder case of the upper boom/compensating cylinder 17 to completely retract the compensating cylinder 28 to reestablish the timing between the two cylinder units.

A second example may arise with the compensating cylinder unit 28 fully retracted prior to the lower boom cylinder unit 9 being completely retracted, such that the cylinder units are again out of proper time relationship. The lower control 53 is again held or piloted to lower the booms. As shown in FIGS. 4 and 5, the normally closed control valve unit 69 is connected between hydraulic lines 55 and 61. The valve unit 69 has a pilot input 73 connected to the line 55. With the lower boom valve actuated in the lower boom retract position, the hydraulic fluid pressure will build in line 55 because the hydraulic fluid path is blocked at the compensating cylinder unit 17, until the pressure reaches the pilot setting of the control valve unit 69. When the pressure reaches this setting, the valve opens and provides an hydraulic fluid path from line 55 through the valve unit 69 to line 61 and the lower boom cylinder unit 9 is able to retract and retime itself with respect to the fully retracted compensating cylinder unit 28.

Both valves 67 and 69 have the pilot signal inputs connected to the supply line 55 and may be simultaneously activated, as hereinafter described. The restrictor 72 in circuit with the valve 67 ensures hydraulic fluid flow through valve 69 under the conditions of the second example.

A further fluid example may occur during the raising of the lower boom 3 to a maximum position. The compensating cylinder unit 28 may be completely extended prior to the corresponding complete extension of the lower boom cylinder unit 9. The lower boom cylinder unit 9 is hydraulically locked in place and will not raise the lower boom cylinder to its full extent. In essence, the cylinder units 9 and 28 are not in a corresponding timed relation. The valve 68 is responsive to this condition and allows the lift cylinder unit 9 to retime. With the lower boom control in the actuated raise position, pressure will begin to build in line 54 which will increase the pressure in line 61. The valve unit 68 is a control valve, which is in a normally closed position. The valve unit 68 is connected between the supply line 55 and the compensating line 61, and normally prevents flow therebetween. Valve 68 includes a pilot input 74 which is connected to line 61. The pressure in line 61 will increase because the hydraulic fluid from the rod end of the lower boom cylinder unit has no path. The pressure in line 61 is applied to valve unit 68 through its pilot input 74 connected to line 61. When the pilot pressure on the valve unit 68 reaches the pilot pressure setting, the valve unit will open, permitting flow from the line 61 to return line 55 and the lower boom cylinder unit 9 will extend fully and automatically retime itself in relationship with the compensating cylinder unit 28. Valve 68 also eliminates any high pressure spikes that can occur between the two cylinders.

The supply pressure as well as the operating pressures and the control valve pilot pressure are, of course, dictated by the particular cylinder sizes and constructions, as well as the load application and the like. Generally, the supply pressure will be substantially above the normal operating pressure of the aerial unit. The valves 67 and 68 are set at a higher pressure which is above the operating pressure and approaching the supply pressure. Typically, valve 69 is set somewhat above the operating pressure, but below the pilot settings of valves 67 and 68. The pressure in line 55 may rise rapidly and actuate both valves 67 and 69, as previously described. The restrictor 72 in the connection to valve 67 ensures that there will always be some flow through valve 69 even when the pressure in line 55 rises to such a level that simultaneously operates valves 67 and 69.

In summary, the hydraulic system provides independent positioning of the lower boom 3 and controlled interrelated positioning of the upper boom 4 relative to the lower booms, as well as a separate preset or adjustment of the upper boom 4. This preset condition can, of course, be established in any position of the lower boom. However, once preset all motion of the lower boom is automatically and simultaneously transmitted to the compensating cylinder for repositioning of the upper boom to maintain the desired optimal relationship relative to the raising and lowering of the lower boom. A complete hydraulic system is disclosed without the necessity of typical mechanical elements such as chains, cables, mechanical linkages, and the like.

Figure 7:
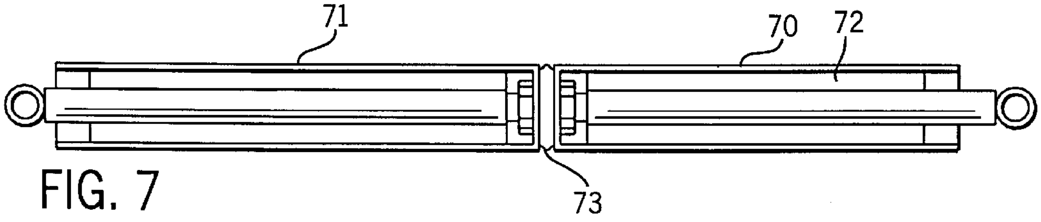
FIG. 7 is a view of a cylinder unit including the upper boom positioning cylinder and a compensating cylinder unit.

The cylinder unit 17 in FIGS. 2–5 is shown with a single outer cylinder case with the common wall defining the compensating cylinder and the upper boom cylinder. The unit may be readily formed as shown in FIG. 7. The unit 70 consists of two separate cylinders 71 and 72 with the base ends separated by an intermediate connection member 73. The system of FIG. 7 is identical to that of the first embodiment.

The preferred tandem cylinder units are shown in FIGS. 1–7 with the individual cylinder units having the common base ends. The system can be constructed, however, with a single casing and without the necessity of base end walls.

Figure 8:
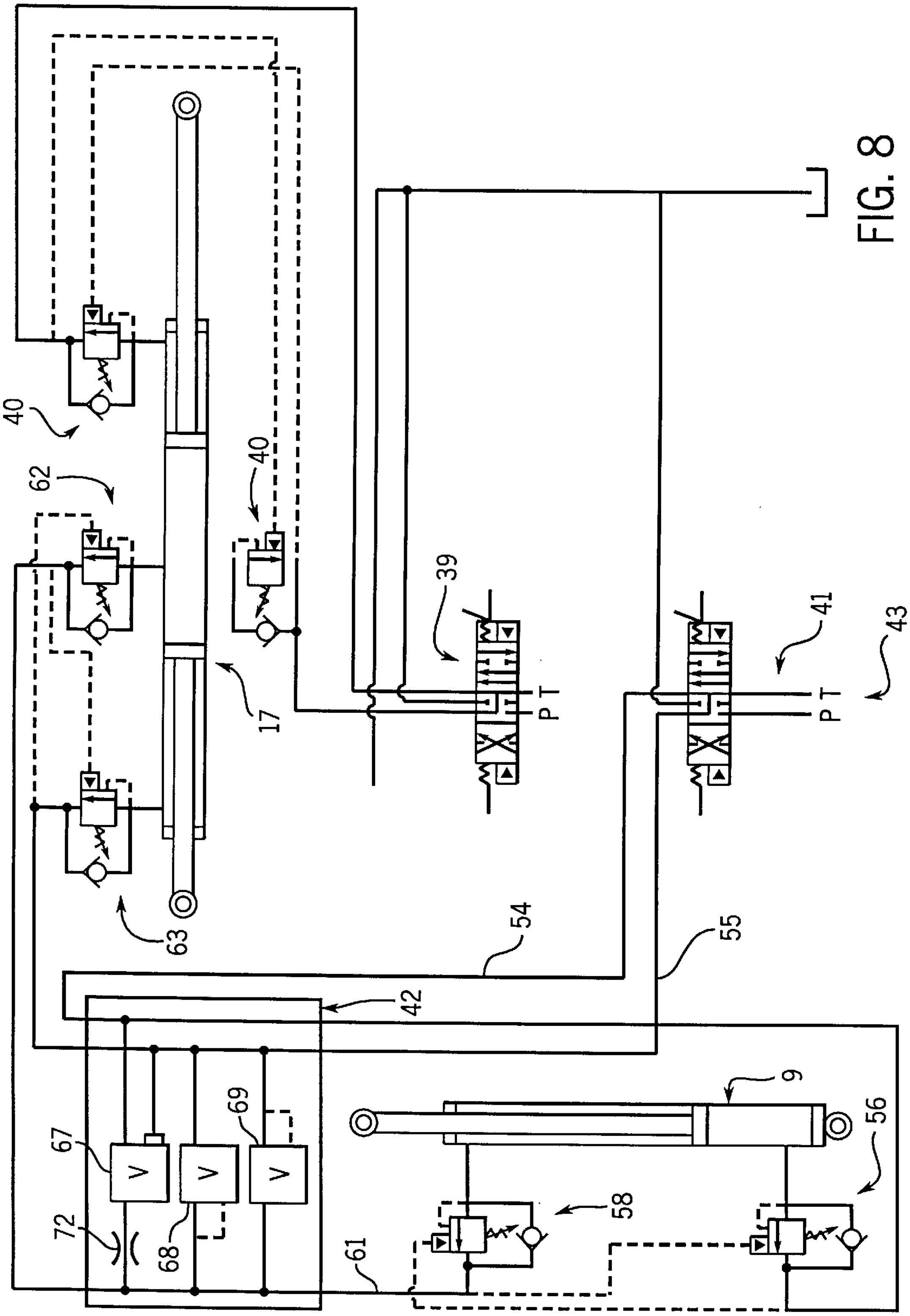
FIG. 8 is a view of a further alternate embodiment.

For example, as shown in FIG. 8. Thus, in the embodiment of FIG. 8, a single casing is provided with a compensating cylinder rod projecting from one end and a upper boom positioning piston rod or cylinder rod projecting from the opposite end. The holding valves are connected to the opposite ends of the cylinder units and function as previously described to produce the compensated position of the upper boom. The components of FIG. 8 are numbered in accordance with the embodiment of FIGS. 1–4.

Other forms of hydraulic motor devices may also be provided within the broadest teaching of the present invention.

Various modes of carrying out the invention are contemplated as being within the scope of the following claims particularly pointing out and distinctly claiming the subject matter which is regarded as the invention.

We claim:

1. A multiple boom lift apparatus, comprising a plurality of elongated booms including at least a first boom including a pivot end and extending outwardly from the pivot end to an outer end a second boom pivotally secured to the outer end of the first boom, a first hydraulic motor unit connected to said first boom for pivotally positioning the first boom, a second hydraulic motor unit connecting the outer end of the first boom to one end of the second boom for pivoting said second boom relative to the first boom for raising and lowering the second boom and a hydraulic flow circuit having a hydraulic supply input and output and a controlled valve assembly connecting said input and said output to said first second hydraulic motor units and including an interrelated flow to said first and second motor units during the pivoting of said first boom to simultaneous establish flow to each of said first and second hydraulic motor units and maintaining a selected interrelated raising and lowering movement therebetween, and wherein each said hydraulic motor units includes first and second hydraulic inputs and establishing a first directional output with a pressurized supply to said first input, a reverse directional output with a pressurized supply connected to said second input, said hydraulic flow circuit including first and second supply lines, said first supply line connected to the first input of the first hydraulic motor unit and the second input supply line connected to the second input of the second hydraulic unit, and including a compensating line connecting the second input of the first hydraulic motor to the first input of the second hydraulic motor thereby establishing serial flow of the hydraulic fluid between said supply input and said first and second hydraulic units.

2. The apparatus of claim 1 including timing control valve units connected between said compensating line and said first and second lines of said hydraulic circuit, said timing control valves responding to different positions of the hydraulic motor units with at least one boom in limit position and the other boom not in a limit position with said booms and the hydraulic motor units at rest.

3. The lift apparatus of claim 1 including a pivot support connected to said pivot end of said first cylinder unit, said first hydraulic cylinder unit has a cylinder and a cylinder rod connected between said first boom and said pivot support, and said second hydraulic motor unit including an upper boom positioning cylinder unit-and a compensating cylinder unit, said positioning cylinder unit including a cylinder and a cylinder rod connected between the first boom and the second boom for positioning the first boom relative to the second boom, and said compensating cylinder unit being connected between said first boom and said second boom, said hydraulic flow circuit being connected to said first hydraulic cylinder unit and said compensating hydraulic cylinder unit, and a separate hydraulic circuit having a supply connected directly to said upper boom positioning cylinder unit for separate positioning of said second boom relative to said first boom.

4. The lift apparatus of claim 3 wherein said hydraulic flow circuit includes a compensating manifold connected between said supply input and said first and second hydraulic cylinder units, said manifold having a first supply line connecting said supply input to one side of the first cylinder unit, and having a second supply line connecting said supply to the one side of said second cylinder unit, and having a third compensating line connecting the second side of each of said cylinder units, and said manifold including a plurality of control valves connected between said third line and said first and second lines and operable to maintain said first hydraulic cylinder unit and said compensating cylinder unit in predetermined timing.

5. The lift apparatus of claim 4 wherein said plurality of control valves includes a first control valve connected between said first supply line connected to said first cylinder unit and said compensating line and having a control signal connected to said second supply line, a second control valve connected between said compensating line and said second supply line connected to said second cylinder unit and having an input connected to said compensating line, and a third control valve connected between said compensating line and said second supply line and having a pilot input connected to said second supply line, said first control valve being normally closed and opened to establish flow from said compensating line to said supply line, said second valve being normally closed and connected to establish flow from the compensating line to said second supply line, and said third valve being normally closed and connected to provide flow from said second supply line to said compensating line, said supply input having an operating pressure significantly above the operating pressure for the lift apparatus, said first and second valves being set to respond to a pressure substantially above the operating pressure and said third valve being operative in response to a pressure above said operating pressure and below the set pressure for said first and second control valves.

6. The apparatus of claim 5 wherein said first control valve includes a restrictor limiting the flow through said first control valve.

7. The lift apparatus of claim 3 wherein the cylinders of said positioning cylinder unit and said compensating cylinder unit are connected in tandem with a common base end and each having said cylinder rods extending therefrom in opposite direction on a common longitudinal axis, one of said rods being connected to said first boom and the other of said rods being connected to the second boom.

8. The lift apparatus of claim 3 wherein said hydraulic flow circuit includes a compensating manifold connected between said supply input and said first and second hydraulic cylinder units, said manifold having a first supply line connecting said supply input to one side of the first cylinder unit, and having a second supply line connecting said supply to the one side of said second cylinder unit, and having a third compensating line connecting the second side of each of said cylinder units, and said manifold including a plurality of control valves connected between said third line and said first and second lines and operable to maintain said first hydraulic cylinder unit and said compensating cylinder unit in predetermined timing, said positioning cylinder unit and said compensating cylinder unit are connected in tandem with a common base end and each having said cylinder rods extending therefrom in opposite direction on common longitudinal axis, one of said rods being connected to said first boom and the other of said rods being connected to the second boom.

9. The lift apparatus of claim 1 including a lowering and raising control valve having a first and second input port and a first and second output port connected to said supply input, said lowering and raising control valve having a first position connecting said first output port to said second output port, said supply valve having a second position connecting said first input port to said first output port and connecting said second input port to said second input port, and said supply valve having a third position connecting said first input port to said second output port and connecting said second input port to said first output port.

10. An aerial lift apparatus, comprising:

a ground support unit;

a lower boom and an upper boom, said lower boom being pivotally connected to said support unit and extending outwardly therefrom, said upper boom overlying said first boom and being pivotally interconnected to the outer end of said lower boom and adapted to be angularly oriented from a collapsed position to an extended position with respect to said lower boom for locating of the outer end of said upper boom in a raised position;

a lower boom hydraulic motor unit connected to said support unit and to said lower boom for raising and lowering of the lower boom about the pivot axis;

an upper boom/compensating hydraulic motor unit including an upper boom hydraulic unit for presetting of the angular orientation of the upper boom relative to the lower boom and including a compensating hydraulic unit interconnected between said lower boom and said upper boom hydraulic unit, said lower boom hydraulic motor unit being connected with said compensation hydraulic unit in a hydraulic flow circuit having a hydraulic fluid supply input and output, said flow circuit including a controlled valve assembly connected said input and said output to said compensating hydraulic unit and said lower boom hydraulic motor unit to provide a selected related movement of said upper boom relative to said lower boom in accordance with the movement of said lower boom about said pivot connection to said support unit.

11. The aerial lift apparatus of claim 10 wherein said upper boom hydraulic unit and said compensating hydraulic unit include tandem cylinder units having cylinder rods extending from opposite ends and connected between said lower boom and said upper boom.

12. The lift apparatus of claim 11 wherein said first and second hydraulic cylinder units include a single elongated cylinder casing with the cylinder rods of said first and second cylinder units project coaxially outwardly from the opposite ends of said cylinder, said piston rods being pivotally connected respectively to the first boom and to the second boom for positioning of said lower boom and said compensating boom relative to each other.

13. The lift apparatus of claim 11 wherein said hydraulic cylinder units each include a cylinder casing having a base end and a rod end and having cylinder rods extending outwardly from the rod ends, said base ends being interconnected to each other to form an elongated cylinder casing with the cylinder rods of the first and second hydraulic cylinder units projecting on a common axis from the opposite ends of said common casing, said first cylinder rod being connected to said first boom and said second cylinder rod being connected to said second boom.

14. The apparatus of claim 13 wherein said hydraulic flow circuit includes first and second supply lines connected to said hydraulic supply input with said first line connected to said lower boom and said second line connected to said compensating cylinder with a pressurized flow selected to one of said lines for raising of said first boom and to said second line for lowering of said first boom, and a compensating line connected to the opposite sides of said hydraulic cylinder, and a manifold unit including a plurality of timing valves connected between said compensating line and said first and second lines for maintaining of said hydraulic cylinders in timed relation to each other.

15. The apparatus of claim 14 wherein said timing control valves are responsive to differential pressure in said compensating line and one of said first and second supply lines to reposition said lower boom cylinder and said compensating cylinder in said timed relation.

16. The apparatus of claim 15 wherein said timing valves includes a first timing valve connected between said first supply line and said compensating line, and said first timing valve having a pressure responsive input and responsive to increasing pressure in the second supply line to open the valve and permit flow from the compensating line to the first supply line.

17. The apparatus of claim 16 wherein said timing valves include a second timing valve connected between said second supply line and said compensating line and responsive to increasing pressure in said supply line to open said second timing valve and permit flow between said second supply line and said compensating line.

18. The apparatus of claim 17 wherein timing valves include a third timing valve connected between said second supply line and said compensating line and responsive to increasing pressure in said compensating line to open said third timing valve and permit flow from said compensating line to said second supply line.

19. The apparatus of claim 16 wherein said timing valves include a second timing valve connected between said second supply line and said compensating line and responsive to increasing pressure in said compensating line to open said third timing valve and permit flow from said compensating line to said second supply line.

20. The apparatus of claim 12 wherein said compensating cylinder unit and said upper boom positioning cylinder unit includes a common cylinder case having a common cylinder wall therebetween and having a compensating cylinder rod and an upper boom cylinder rod projecting from the opposite end of said common cylinder case, holding valves connected to the cylinder case to the opposite sides of the compensating cylinder rod and holding valves connected to the common case to the opposite sides of the upper boom positioning cylinder rod, said lower boom cylinder unit including holding valves interconnected to the opposite sides of the lower boom cylinder rod, a compensating line interconnected between the holding valves on the rod side of one of said cylinder units and the base side of the other cylinder line, a supply line connected to said holding valve on the opposite side of the lower boom cylinder unit from said compensating line and the second supply line connected to the holding valve on the opposite side of compensating cylinder unit.

21. An aerial lift apparatus, comprising: a support structure, a lower boom unit, means pivotally mounting the lower end of the lower boom to said support unit for pivoting about a pivot axis, a lower boom hydraulic cylinder unit for raising and lowering of said lower boom by pivoting thereof about said pivot axis, an upper boom, a pivot unit connected to the outer end of said lower boom, and to the adjacent end of the upper boom, said pivot unit having a generally V-shape with the base and two arms, said arms being connected to said lower boom and to said upper boom, an upper boom/compensating hydraulic cylinder assembly having a compensating hydraulic cylinder and an upper boom positioning hydraulic cylinder connected in tandem and having a compensating cylinder rod and an upper boom cylinder rod, said tandem cylinders being located in-line between said lower boom and said upper boom with said cylinder rods projecting outwardly from the opposite ends thereof, said upper boom cylinder rod being connected to the base of the pivot unit, said compensating cylinder rod being connected to the lower boom whereby actuating of either cylinder reposition said upper boom relative to said lower boom, a first hydraulic fluid supply circuit connected to said upper boom positioning cylinder and operable to preset the location of the upper boom relative to the lower boom, a second hydraulic fluid supply circuit connected to said lower boom cylinder and to said compensating cylinder with flow of hydraulic fluid from the supply moving in series between said lower boom cylinder unit and said compensating cylinder simultaneously positioning the compensating cylinder and lower boom cylinder unit to maintain a selected orientation of the upper boom with respect to said lower boom.

22. The apparatus of claim 21 wherein the supply establishes pressurized hydraulic oil to one end of the lower boom cylinder and exhaust oil from the compensating cylinder, the return oil from the lower boom cylinder being applied to the compensating cylinder and the exhaust oil flow from the compensating cylinder returns to the supply to raise the booms and adjust the position of the upper boom relative to the lower boom, and establishing a reverse oil flow through the compensating cylinder and the lower boom cylinder to lower the booms.

23. A lifting apparatus for pivotally interconnected first and second booms with said first boom pivotally connected to support and a lifting unit connected to said first boom for pivoting of said first boom pivotally connected to a support and a lifting unit connected to said first boom for pivoting of said first boom, comprising a hydraulically actuated assembly having a first hydraulic unit and a second hydraulic unit having connectors for direct connection between said first and second booms for pivotally moving said booms relative to each other, said first hydraulic unit having an input for connection to a hydraulic supply for positioning the booms relative to each other, and said second hydraulic unit having an input for connection to a hydraulic supply and having a valve assembly controlling the hydraulic supply, said valve assembly being connected to said lifting unit connected to said first boom and positioning said second booms relative to the first boom in accordance with the positioning of the first boom to maintain the relative position set by said first hydraulic unit.

24. The lifting apparatus of claim 23 wherein said lifting unit for the first boom is a lifting hydraulic unit having a hydraulic input, and further comprising a hydraulic circuit connection to said input of said first hydraulic unit including said valve assembly for connection with said input to the lifting hydraulic unit and simultaneously actuate said second hydraulic unit with said lifting hydraulic unit.

25. The lifting apparatus of claim 24 wherein said first hydraulic unit and said second hydraulic unit are tandem connected cylinder units having a common abutting base wall structure and having a first and second cylinder rods extending from opposite ends of said tandem connected cylinder units.

26. The method of positioning a first boom including a pivot end and extending outwardly from the pivot end to an outer end and a second boom pivotally secured to the outer end of the first boom in combination with a first hydraulic motor unit connected to said first boom for pivotally positioning the first boom and a second hydraulic motor unit connecting the outer end of the first boom to the outer end of the second boom for pivoting said second boom relative to the first boom comprising supplying hydraulic fluid to said first hydraulic motor unit to raise said first boom and exhaust said hydraulic fluid through said second motor unit during raising to simultaneously position said second boom and maintaining a selected interrelated raising movement therebetween, and including a third hydraulic motor unit connected between said second hydraulic motor unit and said second boom for establishing a preset angular orientation of the first and second booms supplying hydraulic fluid to said second hydraulic motor and exhaust fluid from first hydraulic motor to lower said first boom and simultaneously position said second boom.

27. The method of claim 26 including sensing the pressure of the supply hydraulic fluid and the exhaust fluid between said first and second hydraulic motor and selectively connecting the supply and exhaust flows.

* * * * *

UNITED STATES PATENT AND TRADEMARK OFFICE
CERTIFICATE OF CORRECTION

PATENT NO. : 5,819,534

DATED : October 13, 1998

INVENTOR(S) : GREGORY L. FISCHER ET AL

It is certified that error appears in the above-identified patent and that said Letters Patent is hereby corrected as shown below:

<u>In The Claims</u>

Claim 1, column 9, line 4, after "end" insert -- , --; Claim 1, column 9, line 27, after "boom" insert -- , --; Claim 23, column 14, line 4, delete "booms" and substitute therefor -- boom --; Claim 26, column 14, line 26, after "boom" insert -- , --; Claim 26, column 14, line 29, after "boom" insert -- , --.

Signed and Sealed this

Ninth Day of November, 1999

*Attest:*

Q. TODD DICKINSON

*Attesting Officer*

*Acting Commissioner of Patents and Trademarks*